United States Patent
So et al.

(10) Patent No.: US 10,848,663 B2
(45) Date of Patent: Nov. 24, 2020

(54) ROTATING PLATFORM FOR A COMPUTING DEVICE

(71) Applicant: Hewlett-Packard Development Company, L.P., Houston, TX (US)

(72) Inventors: Chi So, Spring, TX (US); Christoph Graham, Houston, TX (US); Shaheen Saroor, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 509 days.

(21) Appl. No.: 15/567,329

(22) PCT Filed: Jul. 17, 2015

(86) PCT No.: PCT/US2015/040950
§ 371 (c)(1),
(2) Date: Oct. 17, 2017

(87) PCT Pub. No.: WO2017/014728
PCT Pub. Date: Jan. 26, 2017

(65) Prior Publication Data
US 2018/0109725 A1    Apr. 19, 2018

(51) Int. Cl.
*H04N 5/232* (2006.01)
*F16M 11/08* (2006.01)
(Continued)

(52) U.S. Cl.
CPC ......... *H04N 5/23219* (2013.01); *F16M 11/08* (2013.01); *F16M 11/18* (2013.01);
(Continued)

(58) Field of Classification Search
CPC ........ F16M 11/08; F16M 11/18; G06F 21/32; G06K 9/00221; G10L 15/265; H04N 5/23219; H04N 7/142; H04N 7/147
(Continued)

(56) References Cited

U.S. PATENT DOCUMENTS 6,292,713 B1    9/2001 Jouppi et al.
6,920,376 B2    7/2005 Jouppi et al.
(Continued)

FOREIGN PATENT DOCUMENTS

TW    201028888 A1    8/2010
TW    201506885 A     2/2015

OTHER PUBLICATIONS

Webpage ~ < http://9xmedia.com/new/products/xtops.php ~ "The 9X Media X—Top Concept" ~ pulled May 19, 2015 ~ 8 pages.

*Primary Examiner* — William C Vaughn, Jr.
*Assistant Examiner* — Naod W Belai
(74) *Attorney, Agent, or Firm* — HP Inc. Patent Department

(57) ABSTRACT

Examples disclosed herein provide a platform for autonomously rotating a computing device having display surfaces that may be disposed on multiple sides of the computing device. One example method includes monitoring information displayed on the display surfaces and determining there is relevant information from one of the display surfaces to be directed towards a user of the computing device. The method further includes detecting a location of the user with respect to the computing device and rotating the computing device so that the display surface with the relevant information is to be directed towards the detected location of the user.

16 Claims, 4 Drawing Sheets

(51) Int. Cl.
*F16M 11/18* (2006.01)
*G06K 9/00* (2006.01)
*G10L 15/26* (2006.01)
*H04N 7/14* (2006.01)
*G06F 21/32* (2013.01)

(52) U.S. Cl.
CPC ........ *G06K 9/00221* (2013.01); *G10L 15/265* (2013.01); *H04N 7/142* (2013.01); *H04N 7/147* (2013.01); *G06F 21/32* (2013.01)

(58) Field of Classification Search
USPC ........................................................ 348/169
See application file for complete search history.

(56) References Cited

U.S. PATENT DOCUMENTS

| | | | |
|---|---|---|---|
| 8,396,265 B1 * | 3/2013 | Ross | G06K 9/00214 382/103 |
| 8,614,674 B2 | 12/2013 | Binder | |
| 2003/0058372 A1 | 3/2003 | Williams et al. | |
| 2004/0134110 A1 | 7/2004 | Konny | |
| 2009/0102744 A1 | 4/2009 | Ram | |
| 2014/0035794 A1 * | 2/2014 | Chen | G06F 3/1431 345/1.3 |
| 2014/0176424 A1 * | 6/2014 | Hung | G09G 5/006 345/156 |
| 2014/0333671 A1 | 11/2014 | Phang et al. | |
| 2015/0020616 A1 | 1/2015 | Sanchez | |
| 2015/0035947 A1 | 2/2015 | Skyberg | |

* cited by examiner

ROTATING PLATFORM FOR A COMPUTING DEVICE

BACKGROUND

Consumers appreciate ease of use and reliability in their devices. They also appreciate aesthetically pleasing designs. Businesses may, therefore, endeavor to create and provide devices directed toward one or more of these objectives.

DETAILED DESCRIPTION

Examples disclosed herein provide a platform for autonomously rotating a computing device having display surfaces that may be disposed on multiple sides of the computing device. By having multiple display surfaces, each display surface may be customized to display various types information or content for a single user or multiple users. For example, for a single user, one display surface may function as a picture display, another display surface my provide notifications directed toward the user, and another display surface may be used for video conference calls. The platform may autonomously rotate the computing device so that the display surface with relevant information is directed towards the user, as will be further described.

When multiple users are involved, for example, in a sales situation when an agent and customer are involved, the platform may rotate the computing device so that relevant information on a first display surface is directed towards the agent and relevant information on a second display surface is simultaneously directed towards the customer. The autonomous nature of the platform for rotating the computing device, in order to direct relevant information from the multiple display surfaces to users, may provide for the productive use of the computing device.

Figure 1A:
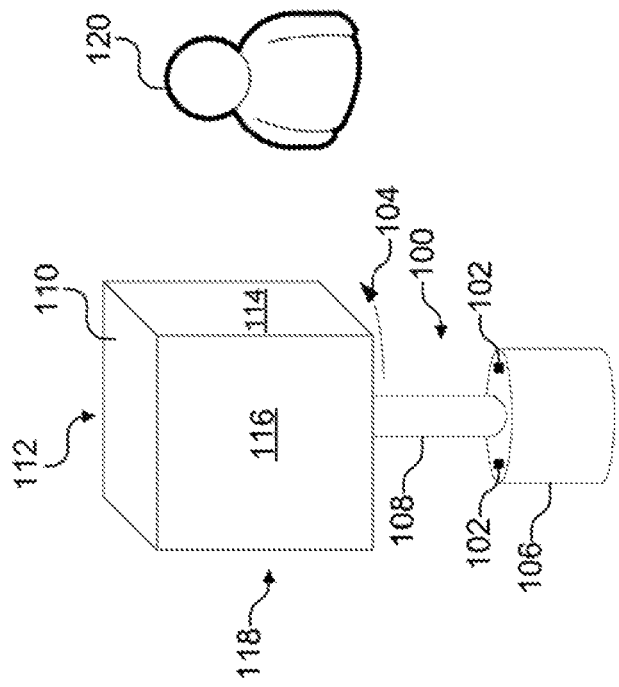
FIGS. 1A-B illustrate a computing device supported by a platform, according to an example.
Figure 1B:
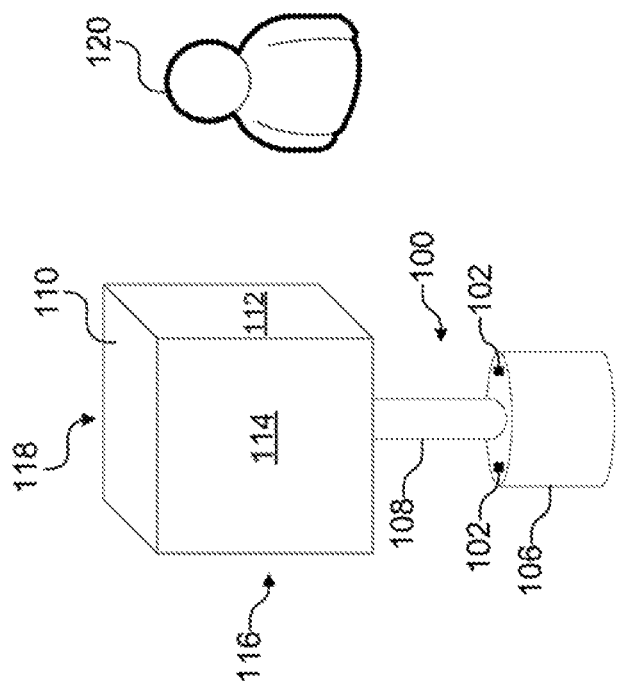

With reference to the figures, FIGS. 1A-B illustrate a computing device 110 supported by a platform 100, according to an example. As illustrated, the computing device 110 has display surfaces 112-118 disposed on multiple sides of the computing device 110. Although the computing device 110 illustrated includes four display surfaces, the computing device 110 may include more or less display surfaces. As described above, by having multiple display surfaces, each display surface may be customized to display various types information or content for a single user or multiple users.

The platform 100 includes a base 106 with the stability to support the computing device 110. As an example, the base 106 may include ports to expand the capabilities of the computing device 110. For example, the base 106 may include optional I/O ports, display controls (e.g., brightness and contrast settings for the display surfaces 112-118), and, physical security. Extending from the base 106, the platform 100 includes a pole 108, or similar extension, to interface with the computing device 110. As an example, the computing device 110 may have an opening to interface with the platform 100. As illustrated, a bottom surface of the computing device 110 may have the opening to interface with the platform 100. As will be further described, the platform 100 may be used to autonomously rotate the computing device 110 so that relevant information from one of the display surfaces 112-118 is directed towards a user 120 of the computing device 110.

As an example, the interface between the computing device 110 and the platform 100 may include signals such as, but not limited to, video, I/O, network, audio, and optional custom signals. A processor in the platform 100 may communicate with the computing device 110 and receive information on what is being displayed on each display surface 112-118. As an example, the processor may receive a notification that relevant information is being displayed on one of the display surfaces, that is to be directed towards a user of the computing device 110 (e.g., user 120).

In order for the platform 100 to rotate the computing device 110 so that the display surface with the relevant information is directed towards the user 120, the location of the user 120 with respect to the computing device may be determined. As an example, the computing device 110 and/or the platform 100 may include sensors 102 for detecting the location of the user 120 with respect to the computing device 110, mainly the head or face of the user 120. Examples of the sensors 102 include, but are not limited to, a camera or other tracking system, such as voice detection, to track the user position with respect to the computing device 110. Although the sensors 102 are on the base 106 of the platform 100, they may also be on the computing device 110.

Upon becoming aware of the information being shown on each display surface 112-118, particularly the display surface with the relevant information, and becoming aware of the direction of the user 120 with respect to the computing device 110, the platform 100 may rotate the computing device 110 so that the display surface with the relevant information is facing the user. As an example, the platform 100 may include a motor (not illustrated) to interface with the computing device 110, in order to rotate the computing device 110. For example, the processor in the platform 100 may control the motor to rotate the computing device 110 to have the display surface with the relevant information face the user 120. The rotation of the computing device 110 can be in a horizontal (e.g., clockwise/counterclockwise) and/or angular direction (e.g., tilt). For example, based on the detected location of the user 120, the computing device 110 may be titled forwards or backwards, so that the user 120 can properly view the display surface with relevant information.

Referring to FIGS. 1A-B, in FIG. 1A, as display surface 112 of the computing device 110 may be displaying relevant information, display surface 112 may be directed towards user 120. Referring to FIG. 1B, if the platform 100 receives a notification from the computing device 110 that relevant information is being displayed on display surface 114, and detects the location of the user 120 with respect to the computing device 110 (e.g., via the sensors 102), the platform 100 may rotate the computing device 110 counterclockwise, indicated by arrow 104, so that display surface 114 is facing the user 120.

As an example, facial recognition may be applied, for example, with a camera, if authentication is needed before information is displayed on one of the display surfaces for a designated user. For example, if there are a plurality of users around the computing device, facial recognition may be used to detect the location of the designated user, in order to ensure that other users from the plurality of users are not able to view the relevant information displayed on the display surface. In addition, facial recognition may be used for authenticating the user 120 prior to even rotating the computing device 110.

Figure 2:
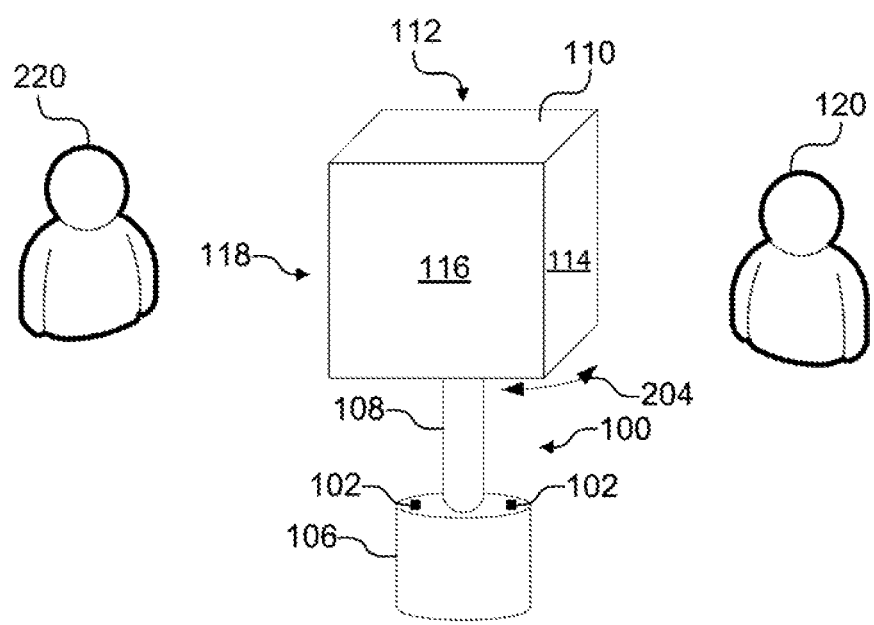
FIG. 2 illustrates the computing device being viewed by multiple users, according to an example.

FIG. 2 illustrates the computing device 110 being viewed by multiple users 120, 220, according to an example. As mentioned above, when multiple users are involved, for example, in a sales situation when an agent and customer are involved, the platform 100 may rotate the computing device 110 so that relevant information on a first display surface is directed towards the agent and relevant information on a second display surface is simultaneously directed towards the customer.

Adding to the example described in FIGS. 1A-B, an additional user 220 may view information from one of the display surfaces 112-118 of the computing device 110. As an example, the platform 100 may receive a notification that relevant information is being displayed on one of the display surfaces to be directed towards the additional user 220. The sensors 102 may detect the location of the additional user 220 with respect to the computing device. Examples of the sensors 102 include, but are not limited to, a camera or other tracking system, such as voice detection, to track the user position with respect to the computing device 110. Upon becoming aware of the direction of the additional user 220 with respect to the computing device 110, the platform 100 may rotate (indicated by arrow 204) the computing device 110 so that the display surface with the relevant information is facing the additional user 220. As multiple users 120, 220 are viewing different display surfaces of the computing device 110, coordination may be required so that relevant information is displayed for the various users.

Figure 3:
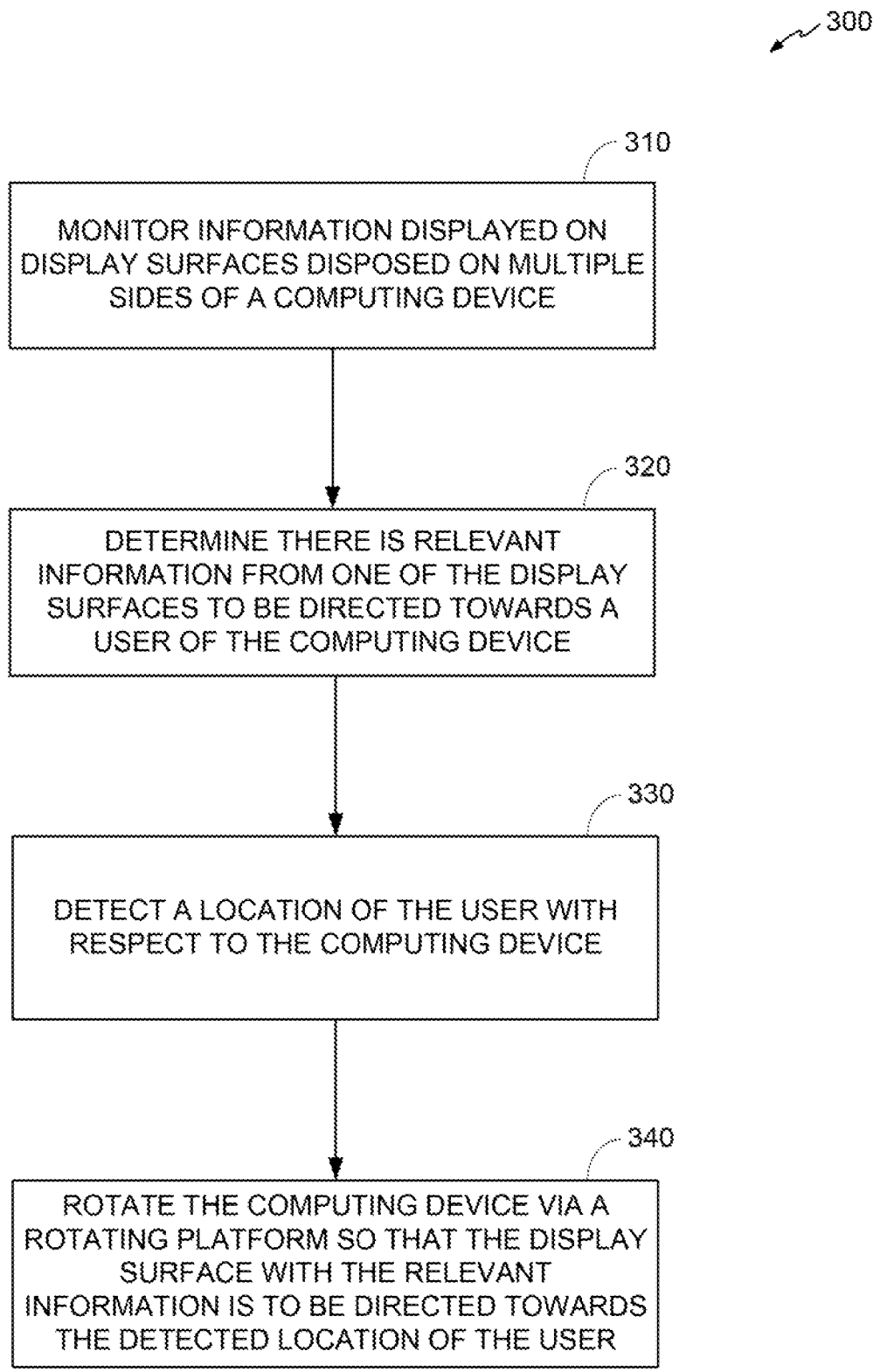
FIG. 3 is a flow diagram in accordance with an example of the present disclosure.

Referring to FIG. 3, a flow diagram is illustrated in accordance with various examples. The flow diagram illustrates, in a particular order, processes for a rotating platform to autonomously rotate a computing device having display surfaces that may be disposed on multiple sides of the computing device. The order of the processes is not meant to limit the disclosure. Rather, it is expressly intended that one or more of the processes may occur in other orders or simultaneously. The disclosure is not to be limited to a particular example.

A method 300 may begin and progress to 310, where the platform may monitor information displayed on the display surfaces disposed around the computing device. As an example, a processor in the platform may communicate with the computing device and receive information on what is being displayed on each of the display surfaces.

Progressing to 320, the platform may determine there is relevant information from one of the display surfaces to be directed towards a user of the computing device. As an example, the platform may make this determination upon receiving a notification from the computing device.

Progressing to 330, the platform may detect a location of the user with respect to the computing device. As an example, the location of the user with respect to the computing device may be detected via sensors. Examples of the sensors include, but are not limited to, a camera or other tracking system, such as voice detection, to track the user position with respect to the computing device.

Progressing to 340, the platform may rotate the computing device so that the display surface with the relevant information is to be directed towards the detected location of the user. As an example, upon detecting the location of the user with respect to the computing device, the platform may use a camera to authenticate the user via facial recognition prior to rotating the computing device. If the facial recognition does not authenticate the user, the platform may communicate to the computing device not to display the relevant information. As an example, the facial recognition may be used to detect the location of the user from a plurality of users around the computing device.

When other users from a plurality of users are each viewing information from the different display surfaces of the computing device, the platform may determine there is relevant information from the display surfaces to be directed towards the other users. The platform may detecting locations of the other users with respect to the computing device, and rotate the computing device so that the display surfaces with the relevant information is each to be directed towards the detected locations of the other users.

Figure 4:
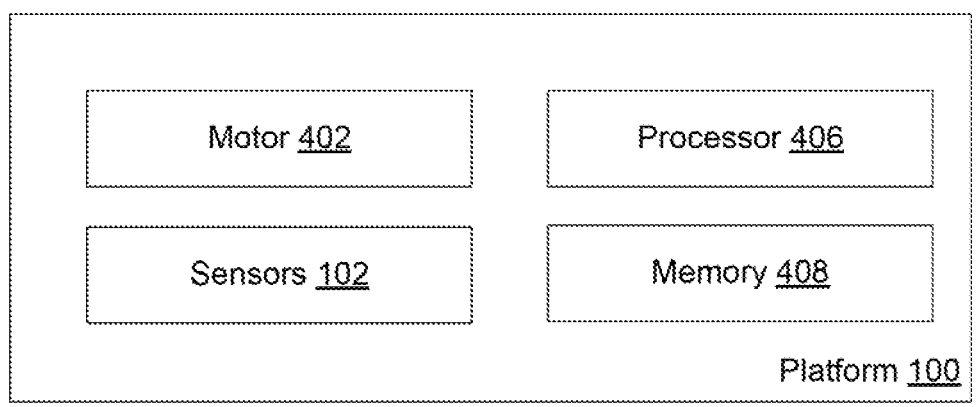
FIG. 4 is a block diagram illustrating the platform described above, according to an example.

FIG. 4 is a block diagram illustrating the platform 100 described above, according to an example. As illustrated, the platform 100 includes sensors 102 and a motor 402. As described above, the sensors 102 may detect the location of users with respect to the computing device 110, mainly the head or face of the users (e.g., see FIG. 1A). Examples of the sensors 102 include, but are not limited to, a camera or other tracking system, such as voice detection, to track the user position with respect to the computing device 110. The motor 402 may interface with the computing device 110 in order to rotate the computing device 110.

The platform 100 also includes a processor 406. As an example, the processor 406 may communicate with the computing device 110 and receive information on what is being displayed on each display surface 112-118. In addition, the processor 406 may control the motor 402 to rotate the computing device 110 to have the display surface with the relevant information face users. The components of the platform 100 may be connected and communicate through a system bus (e.g., PCI, ISA, PCI-Express, HyperTransport®, NuBus, etc.). The processor 406 can be a single core processor, a multi-core processor, a computing cluster, or any number of other configurations. The processor 406 may be implemented as Complex Instruction Set Computer (CISC) or Reduced Instruction Set Computer (RISC) processors, x86 Instruction set compatible processors, multi-core, or any other microprocessor or central processing unit (CPU). As an example, the processor 406 includes dual-core processor(s), dual-core mobile processor(s), or the like.

The platform 100 may include a memory resource 408. The memory resource 408 can include random access memory (e.g., SRAM, DRAM, zero capacitor RAM, SONGS, eDRAM, EDO RAM, DOR RAM, RRAM, PRAM, etc.), read only memory (e.g., Mask ROM, PROM, EPROM, EEPROM, etc.), flash memory, or any other suitable memory systems. The memory resource 408 may be a non-transitory computer-readable storage medium. The memory resource 408 may have programming instructions stored thereon that, in response to execution of the programming instructions by a processing resource, such as the processor 406, cause the platform 100 to perform operations. As an example, the operations may be executed by the motor 402.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method performed by a system comprising a hardware processor, comprising:
    monitoring information displayed on display surfaces disposed on multiple sides of a computing device, the display surfaces comprising a first display surface and a second display surface;
    determining first information displayed by the first display surface to be directed towards a first user of the computing device, and determining second information displayed by the second display surface to be directed towards a second user of the computing device;
    detecting locations of the first and second users with respect to the computing device; and
    rotating the computing device via a rotating platform so that the first display surface displaying the first information is directed towards the detected location of the first user, and the second display surface displaying the second information is directed towards the detected location of the second user.

2. The method of claim 1, comprising performing facial recognition of the first and second users to detect the locations of the first and second users.

3. The method of claim 2, wherein the displaying of the first information is based on an authentication of the first user according to the facial recognition of the first user.

4. The method of claim 1, wherein the detected via detecting of the locations of the first and second users is based on data from sensors.

5. The method of claim 1, wherein the rotating platform comprises the system that includes the hardware processor.

6. The method of claim 1, wherein the rotating of the computing device comprises rotating the computing device in a horizontal rotational direction.

7. The method of claim 1, wherein the rotating platform comprises a base and a pole that extends from the base, the pole supporting the computing device that is rotated.

8. A platform to rotate a computing device having display surfaces disposed on multiple sides of the computing device, the platform comprising:
    a motor to interface with the computing device to rotate the computing device;
    sensors;
    a processor; and
    a storage medium storing instructions executable on the processor to:
        receive a notification that first information is being displayed on a first display surface of the display surfaces to be directed towards a first user of the computing device, and that second information is being displayed on second display surface of the display surfaces to be directed towards a second user of the computing device;
        detect, based on data from the sensors, locations of the first and second users with respect to the computing device; and
        cause rotation, by the motor, the computing device so that the first display surface with the first information is directed towards the detected location of the first user, and that the second display surface with the second information is directed towards the second user of the computing device.

9. The platform of claim 8, wherein the instructions are executable on the processor to cause the platform to receive, from the computing device, information on what is being displayed on each display surface of the display surfaces.

10. The platform of claim 8, wherein the instructions are executable on the processor to cause the rotation of the computing device in a horizontal rotational direction.

11. The platform of claim 8, wherein the instructions are executable on the processor to authenticate, via a camera, the first user via facial recognition prior to rotating the computing device.

12. The platform of claim 11, wherein the facial recognition is used to detect the location of the first user from among a plurality of users around the computing device.

13. The platform of claim 8, further comprising a base and a pole extending from the base, the pole to support the computing device.

14. A non-transitory computer-readable storage medium comprising instructions that when executed cause a system to:
    monitor information displayed on display surfaces disposed on multiple sides of a computing device, the display surfaces comprising a first display surface and a second di splay surface;
    determine first information displayed by the first display surface to be directed towards a first user of the computing device, and determining second information displayed by the second display surface to be directed towards a second user of the computing device;
    detect locations of the first and second users with respect to the computing device; and
    cause rotation of the computing device via a rotating platform so that the first display surface displaying the first information is directed towards the detected location of the first user, and the second display surface displaying the second information is directed towards the detected location of the second user.

15. The non-transitory computer-readable storage medium of claim 14, wherein the instructions when executed cause the system to perform facial recognition of the first and second users to detect the locations of the first and second users.

16. The non-transitory computer-readable storage medium of claim 15, wherein the displaying of the first information is based on an authentication of the first user according to the facial recognition of the first user.

* * * * *